US007554608B2

(12) United States Patent
Kawamura

(10) Patent No.: US 7,554,608 B2
(45) Date of Patent: Jun. 30, 2009

(54) VIDEO COMPOSITION CIRCUIT FOR PERFORMING VERTICAL FILTERING TO α-BLENDED VIDEO DATA AND SUCCESSIVELY INPUT VIDEO DATA

(75) Inventor: Makoto Kawamura, Takatsuki (JP)

(73) Assignee: Panasonic Corporation, Osaka (JP)

( * ) Notice: Subject to any disclaimer, the term of this patent is extended or adjusted under 35 U.S.C. 154(b) by 650 days.

(21) Appl. No.: 10/551,133

(22) PCT Filed: Apr. 1, 2004

(86) PCT No.: PCT/JP2004/004774

§ 371 (c)(1),
(2), (4) Date: Sep. 29, 2005

(87) PCT Pub. No.: WO2004/090860

PCT Pub. Date: Oct. 21, 2004

(65) Prior Publication Data

US 2006/0187354 A1    Aug. 24, 2006

(30) Foreign Application Priority Data

Apr. 1, 2003    (JP) ............................. 2003-097542

(51) Int. Cl.
*H04N 9/74* (2006.01)
*H04N 9/76* (2006.01)
(52) U.S. Cl. ........................... 348/584; 348/598
(58) Field of Classification Search ................ 348/584, 348/597, 598, 458, 448; 382/298–300; 345/629, 345/639, 640, 660, 667
See application file for complete search history.

(56) References Cited

U.S. PATENT DOCUMENTS

| 5,091,786 | A |  | 2/1992 | Miyaguchi |
|---|---|---|---|---|
| 6,088,355 | A | * | 7/2000 | Mills et al. ................. 370/392 |
| 6,335,764 | B1 |  | 1/2002 | Hashimoto et al. |
| 6,380,945 | B1 | * | 4/2002 | MacInnis et al. ............ 345/602 |
| 6,518,974 | B2 | * | 2/2003 | Taylor et al. ................ 345/582 |
| 6,674,479 | B2 | * | 1/2004 | Cook et al. ................. 348/453 |
| 6,677,981 | B1 | * | 1/2004 | Mancuso et al. ............. 348/36 |
| 6,738,526 | B1 | * | 5/2004 | Betrisey et al. ............ 382/260 |
| 7,158,147 | B2 | * | 1/2007 | Watson et al. .............. 345/609 |
| 7,184,059 | B1 | * | 2/2007 | Fouladi et al. ............. 345/604 |
| 2002/0106018 | A1 | * | 8/2002 | D'Luna et al. .......... 375/240.01 |

FOREIGN PATENT DOCUMENTS

| JP | 11-352946 | 12/1999 |
|---|---|---|
| JP | 2000-347638 | 12/2000 |
| JP | 2002-149150 | 5/2002 |
| JP | 2002-366128 | 12/2002 |

* cited by examiner

*Primary Examiner*—Victor R Kostak
(74) *Attorney, Agent, or Firm*—Wenderoth, Lind & Ponack, L.L.P.

(57) ABSTRACT

When transferring data from an external storage unit (101) to a video composition circuit, the transferred data and data stored in an internal storage unit (104) of the video composition circuit are subjected to vertical filtering using a video processing circuit (103). The video processing circuit (103) having a function of an OSD output unit, a function of a sub video output unit, and a function of a main video output unit. Additionally, the video processing circuit (103) having an α-blending function, to write the data over the internal storage unit (104), thereby performing display.

5 Claims, 5 Drawing Sheets

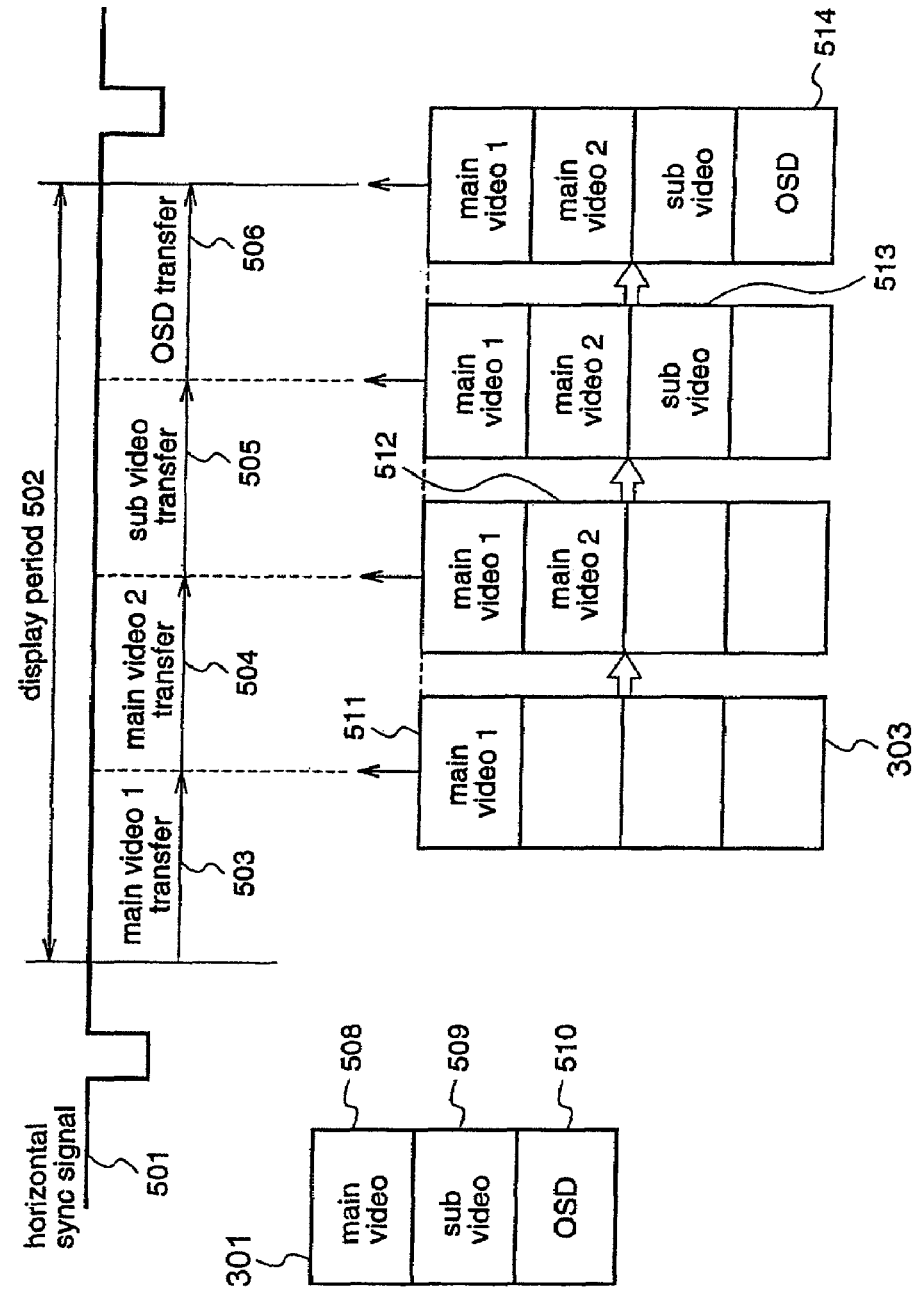

VIDEO COMPOSITION CIRCUIT FOR PERFORMING VERTICAL FILTERING TO α-BLENDED VIDEO DATA AND SUCCESSIVELY INPUT VIDEO DATA

BACKGROUND OF THE INVENTION

1. Field of the Invention

The present invention relates to a video composition circuit such as a television and, more particularly, to a reduction in the circuit scale.

2. Description of the Related Art

Conventionally, when image composition or filtering is carried out in a video composition circuit such as a television, different circuits are prepared every time the composition is carried out.

Hereinafter, a conventional video composition circuit will be described.

FIG. 3 shows a conventional video composition circuit.

In FIG. 3, 301 denotes an external storage unit provided outside the video composition circuit, 302 denotes a transfer control unit for controlling transfer of data from the external storage unit 301, 303 denotes an internal storage unit provided in the video composition circuit, 304 denotes an OSD output unit for processing OSD display data outputted from the internal storage unit 303 to perform OSD output, 305 denotes a sub video output unit for processing sub video data outputted from the internal storage unit 303 to perform sub video output, 306 denotes a main video output unit for processing main video data outputted from the internal storage unit 303 to perform main video output, and 307 denotes a video output unit for combining the outputs from the OSD output unit 304, the sub video output unit 305, and the main video output unit 306 to perform video output. Further, 308 denotes, for example, a display having a digital signal input, which displays the video signal outputted from the video output unit 307. In the above-mentioned construction, the constituents other than the external storage unit 301 and the display 303 are fabricated on the same chip.

Further, an LUT (Look Up Table) circuit, for performing color conversion processing such as CLUT (Color Look Up Table) processing and gamma correction processing, is incorporated in the OSD output unit, and a DDA (Digital Differential Analysis) circuit for performing inter-pixel interpolation by digital differential analysis is incorporated in each of the main video output unit 306 and the sub video output unit 305 according to need. Further, a DDA circuit and two α composition circuits are incorporated in the main video output unit 306.

The operation of the video composition circuit constructed as described above will be described with reference to FIG. 5.

The main video data 508, the sub video data 509, and the OSD data 510 are serially and successively outputted from the external storage unit 301, respectively.

During a main video 1 transfer period 503, main video data 508 is transferred from the external storage unit 301 through the transfer control unit 302 to the internal storage unit 303, and stored as main video 1 (511) in the internal storage unit 303. Subsequently, during a main video 2 transfer period 504, another main video data 508 is transferred from the external storage unit through the transfer control unit 302 to the internal storage unit 303, and further, the main video data 508 is transferred to the main video output unit 306 and processed, and stored as data 512 after main video filtering in the internal storage circuit 303.

Next, during a sub video transfer period 505, sub video data 509 is transferred from the external storage unit 301 through the transfer control unit 302 to the internal storage unit 303, and further, the sub video data 509 is transferred to the sub video output unit 305 and processed, and the processed main video and sub video data 513 is stored in the internal storage circuit 303.

Next, during an OSD transfer period 506, OSD display data 510 is transferred from the external storage unit 301 through the transfer control unit 302 to the internal storage unit 303, and further, the OSD display data 510 is transferred to the OSD output unit 304 and processed. Furthermore, in the subsequent-stage video output unit 307, the OSD display data processed by the OSD output unit 304 and the previously processed main video and sub video data 513 are combined, thereby obtaining final output video data 514.

In the operation of the above-mentioned circuit, the processings are finally carried out in synchronization with a display period 502 which is a display speed of frames based on a horizontal sync signal 501.

Patent Document 1: Japanese Published Patent Application No. Hei. 11-352946 (Page 17, FIG. 1)

BRIEF SUMMARY OF THE INVENTION

In the conventional video composition circuit, the complicated video output unit 307 for α-blending three outputs from the OSD output unit 304, the sub video output unit 305, and the main video output unit 306 is required. Further, since the data of the respective layers, i.e., the OSD display data, the sub video data, and the main video data, are stored in the internal storage unit 303, the size of the internal storage unit is undesirably increased. Further, both of the main video output unit 306 and the sub video output unit 305 are provided with the DDA (Digital Differential Analysis) circuits, and thereby the size of the whole device is undesirably increased. Further, the OSD output unit, the sub video output unit, and the main video output unit are specially incorporated, and therefore, it is difficult to alter the functions of these circuits.

The present invention is made to solve the above-described problems and has for its object to provide a video composition circuit that can reduce the circuit scale.

In order to solve the above-mentioned problems, according to a first aspect of the present invention, there is provided a video composition circuit for receiving plural pieces of video data which are successively inputted in serial order, performing a predetermined video processing for predetermined video data, and combining plural pieces of video data to output composite data, and the video composition circuit comprises: a video processing unit to which plural pieces of video data are successively inputted in serial order, performing a predetermined video processing to the inputted video data, and outputting the processed video data; a video data composition unit for combining the plural pieces of video data outputted from the video processing unit to output composite data; and a data storage unit for holding the video data outputted from the video data composition unit. The video data composition unit being a circuit having an α-blending function, and combining the video data read from the data storage unit and the video data outputted from the video processing unit, as well as combining the plural pieces of video data outputted from the video processing unit, thereby performing vertical filtering to the video data successively inputted in serial order and to the α-blended video data stored in the data storage unit.

According to a second aspect of the present invention, in the video composition circuit defined in the first aspect of the present invention, the video processing unit, the data storage unit, and the video data composition unit are constituted on the same chip.

According to a third aspect of the present invention, in the video composition circuit defined in the first aspect of the present invention, the plural pieces of video data successively inputted in serial order are main video, sub video, and OSD video which is additional information to be displayed simultaneously with the main and sub videos.

According to a fourth aspect of the present invention, the video composition circuit defined in the third aspect of the invention further includes an external storage unit for holding the plural pieces of video data that are successively inputted in serial order, the external storage unit being placed outside the chip, wherein the video data composition unit reads the video data outputted from the external storage unit and the α-blended video data which is stored in the data storage unit in the chip, and subjects these data to α-blending again.

According to a fifth aspect of the present invention, in the video composition circuit defined in the first aspect of the present invention, the video data composition unit writes the video data which is obtained as a result of combining the video data read from the data storage unit and the video data outputted from the video processing unit, over the video data which has previously been stored in the data storage unit.

As described above, according to the first aspect of the present invention, there is provided a video composition circuit for receiving plural pieces of video data which are successively inputted in serial order, performing a predetermined video processing for predetermined video data, and combining plural pieces of video data to output composite data, and the video composition circuit comprises: a video processing unit to which plural pieces of video data are successively inputted in serial order, performing a predetermined video processing to the inputted video data, and outputting the processed video data; a video data composition unit for combining the plural pieces of video data outputted from the video processing unit to output composite data; and a data storage unit for holding the video data outputted from the video data composition unit; and the video data composition unit being a circuit having an α-blending function, and combining the video data read from the data storage unit and the video data outputted from the video processing unit, as well as combining the plural pieces of video data outputted from the video processing unit, thereby performing vertical filtering to the video data successively inputted in serial order and to the α-blended video data stored in the data storage unit. Therefore, the circuit scale can be reduced by integrating the video processing unit, the video data composition unit, and the data storage unit on a single circuit.

According to the second aspect of the present invention, in the video composition circuit defined in the first aspect of the invention, the video processing unit, the data storage unit, and the video data composition unit are constituted on the same chip. Therefore the circuit scale can be reduced.

According to the third aspect of the present invention, in the video composition circuit defined in the first aspect, the plural pieces of video data successively inputted in serial order are main video, sub video, and OSD video which is additional information to be displayed simultaneously with the main and sub videos. Therefore, there is required only one α-blending circuit having an OSD display function, a sub video display function, a main video display function, and an α-blending function, whereby the circuit scale can be reduced. Further, since the OSD output unit, the sub video output unit, and the main video output unit are united to be one circuit, functions which have conventionally been realized for sub video but have not been realized for OSD can be used for OSD.

According to the fourth aspect of the present invention, the video composition circuit defined in the third aspect of the invention further includes an external storage unit for holding the plural pieces of video data that are successively inputted in serial order, the external storage unit being placed outside the chip; and the video data composition unit reads the video data outputted from the external storage unit and the α-blended video data which is stored in the data storage unit in the chip, and subjects these data to α-blending again. Therefore, the internal storage unit is used so that data are overwritten, whereby the amount of usage of the internal storage unit can be reduced.

According to a sixth aspect of the present invention, in the video composition circuit defined in the first aspect of the invention, the video data composition unit writes the video data which is obtained as a result of combining the video data read from the data storage unit and the video data outputted from the video processing unit, over the video data which has previously been stored in the data storage unit. Therefore, the internal storage unit is used so that data are overwritten, whereby the amount of usage of the internal storage unit can be reduced.

BRIEF DESCRIPTION OF THE DRAWINGS

FIG. 5 is a diagram for explaining the processing operation of the conventional video processing apparatus.

DETAILED DESCRIPTION OF THE INVENTION

Embodiment 1

Hereinafter, an embodiment of the present invention will be described with reference to FIGS. 1 and 2.

Figure 1:
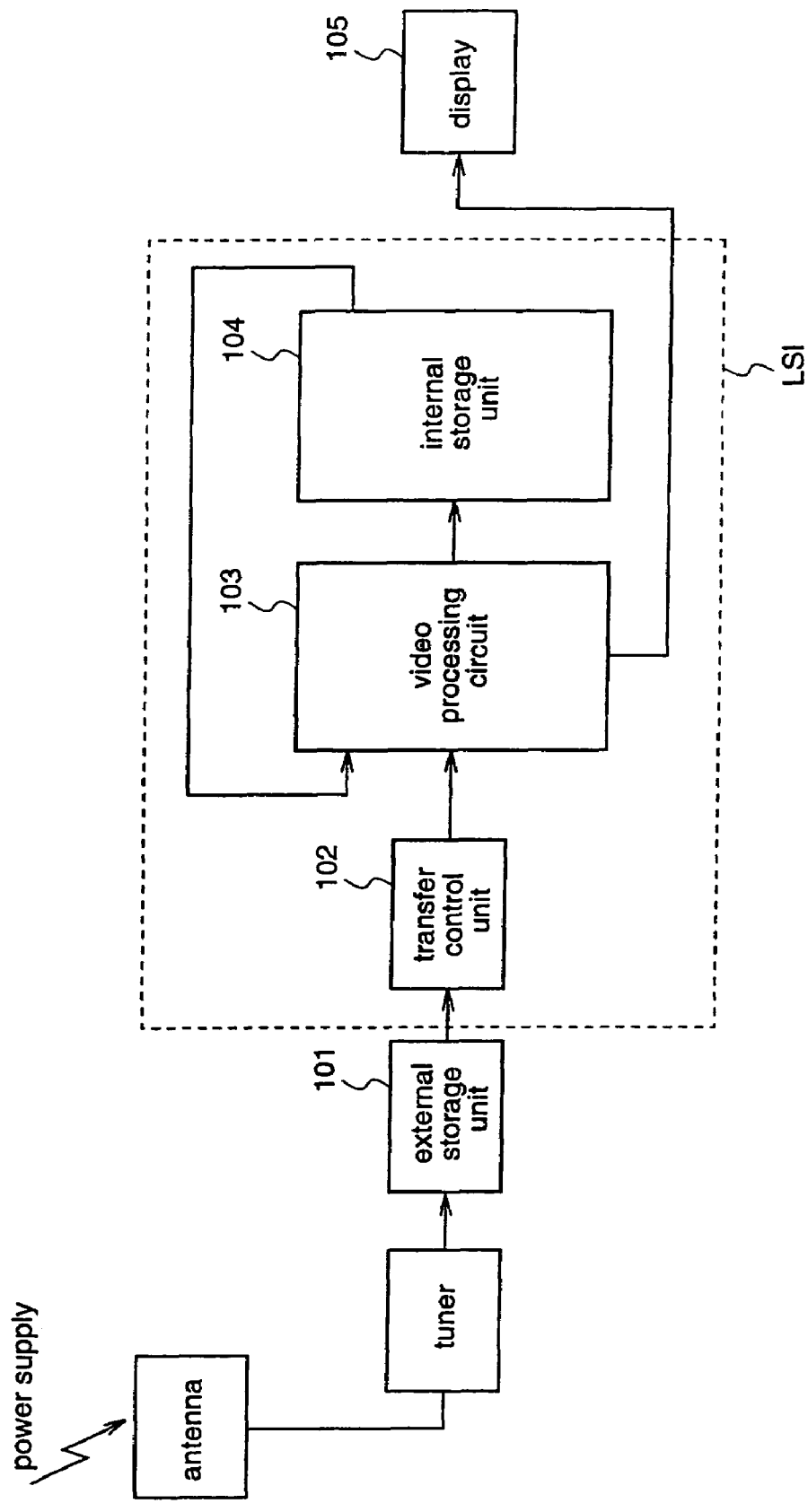
FIG. 1 is a block diagram illustrating the construction of a video processing apparatus (video composition circuit) according to a first embodiment of the present invention.

FIG. 1 shows a video composition circuit according to a first embodiment of the present invention. In FIG. 1, reference numeral 101 denotes an external storage unit for holding main video data, sub video data, and OSD display data, which is provided outside the video composition circuit. Reference numeral 104 denotes an internal storage unit for holding the main video data, the sub video data, and the OSD display data, which is provided inside the video composition circuit. Reference numeral 102 denotes a transfer control unit for controlling transfer of data from the external storage unit 101 to the internal storage unit 104, and reference numeral 103 denotes a video processing circuit which receives the video data read from the external storage unit 101 by the transfer control unit 102, and the video data read from the internal storage unit 104, and subjects these video data to video processing. Reference numeral 105 denotes, for example, a display having a digital signal input, for displaying data outputted from the video processing circuit 103. In the above-mentioned construction, the transfer control unit 102, the video processing circuit 103, and the internal storage unit 104 are fabricated on the same chip (LSI).

Figure 4:
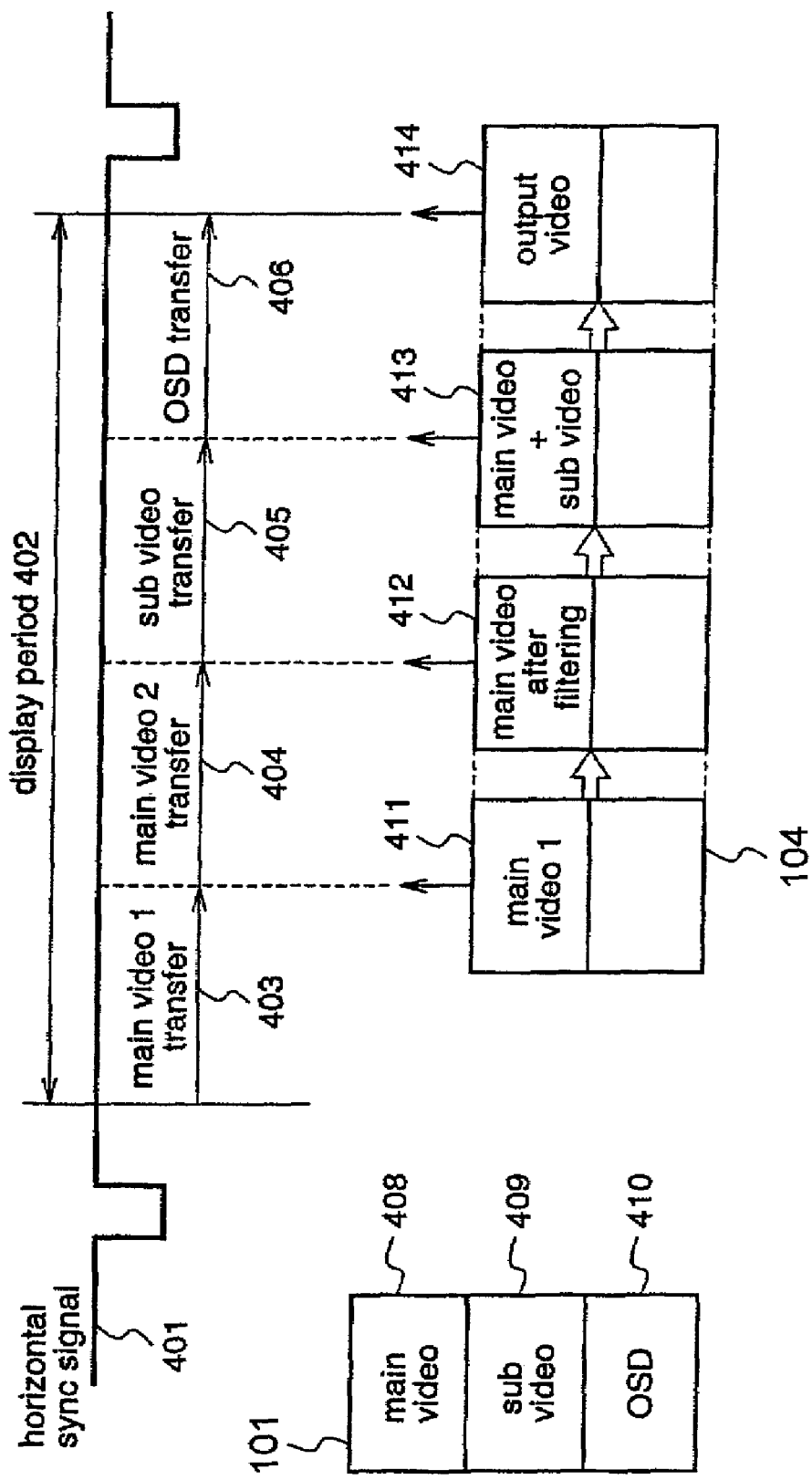
FIG. 4 is a diagram for explaining the processing operation of the video processing apparatus according to the first embodiment of the present invention.

Hereinafter, the operation of the video composition circuit constructed as described above will be described with reference to FIG. 4.

Initially, during a main video 1 transfer period 403, main video 1 data stored in the external storage unit 101 is transferred through the transfer control unit 102, processed in the video processing circuit 103, and stored in the internal storage unit 104 as main video 1 data 411. Next, during a main video 2 transfer period 404, main video 2 data stored in the external storage unit 101 is transferred through the transfer control unit 102, processed in the video processing circuit 103, and written over the data 411 to be stored as main video filtered data 412 in the internal storage unit 104.

Next, during a sub video transfer period 405, sub video data stored in the external storage unit 101 is transferred through the transfer control unit 102, and processed in the video processing circuit 103 together with the data (412) which has previously been stored in the internal storage unit 104, and the processed data is written over the data 412 to be stored as main video+sub video data 413 in the internal storage unit 104.

Next, during an OSD transfer period 406, OSD data stored in the external storage unit 101 is transferred through the transfer control unit 102, and processed in the video processing circuit 103 together with the data 413 which has previously been stored in the internal storage unit 104, and the processed data is written over the data 413 to be stored as output video 414 in the internal storage unit 104.

Figure 2:
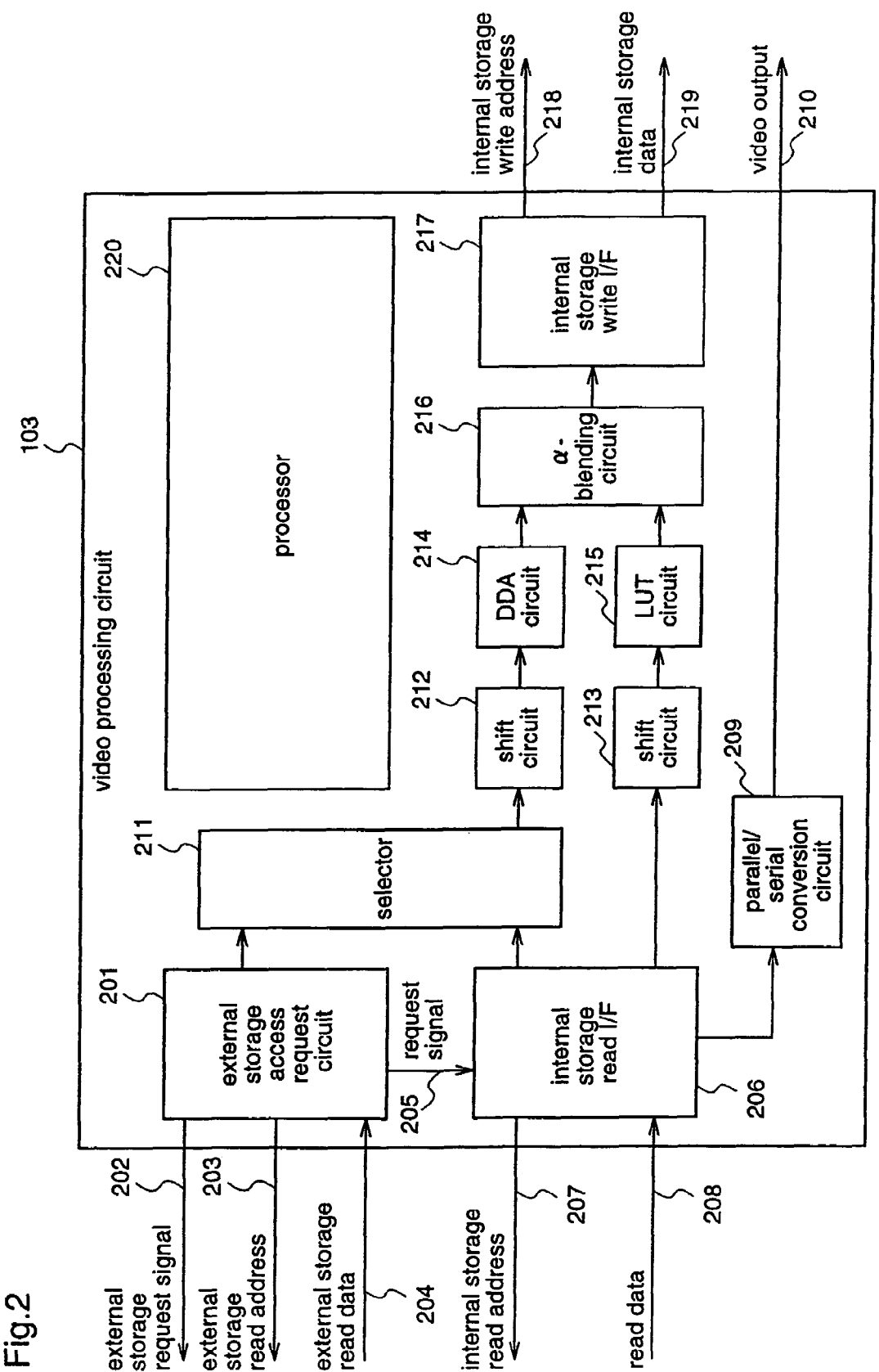
FIG. 2 is a block diagram illustrating the construction of a video processing circuit included in the video processing apparatus according to the first embodiment of the present invention.
Figure 3:
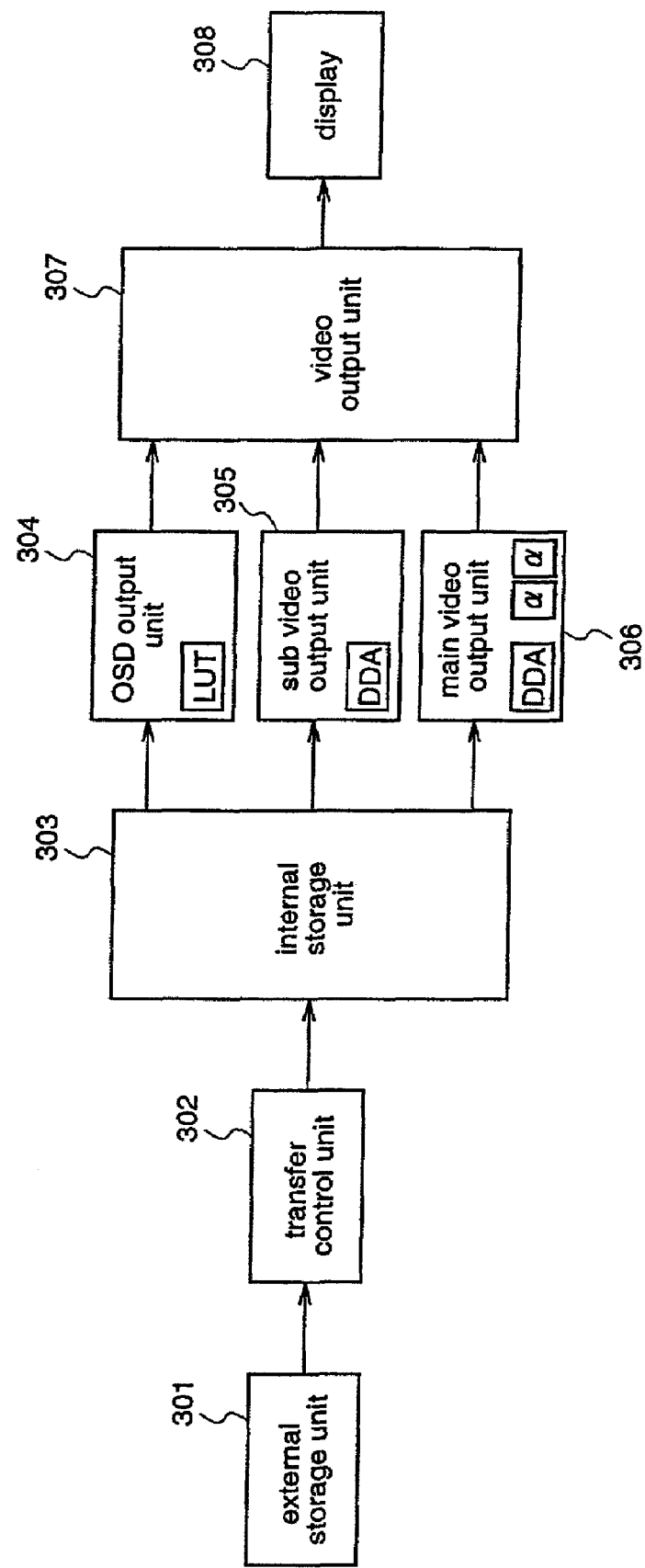
FIG. 3 is a block diagram illustrating the construction of a conventional video processing apparatus.

FIG. 2 shows the specific construction of the video processing circuit 103. In FIG. 2, reference numeral 201 denotes an external storage access request circuit which outputs an external storage request signal 202 that requests an access to the external storage unit 101, and an external storage read address 203 that indicates a read address thereof, through the transfer control unit 102 to the external storage unit 101. Thereby, external storage read data 204 is obtained from the external storage unit 101 through the transfer control unit 102.

Further, the external storage access request circuit 201 outputs a request signal 205 (that requests an access to the internal storage unit 104) to an internal storage read interface (hereinafter referred to as I/F) 206.

The internal storage read I/F 206 receives the request signal 205, and outputs an internal storage read address 207 to the internal storage unit 104. Thereby, read data 208 is obtained from the internal storage unit 104.

A parallel/serial conversion circuit 209 converts the output 208 (received from the internal storage read I/F 206) from parallel data to serial data, and outputs a video output 210 to the internal storage unit 104.

The internal storage unit 104 outputs the video output converted into serial data to the outside as an output of the video composition circuit.

A selector 211 selects either the external storage read data 204 that is read by the external storage access request circuit 201 or the read data 208 that is read by the internal storage read I/F 206.

A shift circuit 212 processes the read data selected by the selector 211 into pixel-unit data as required.

A DDA (Digital Differential Analysis) circuit 214 performs inter-pixel interpolation by digital differential analysis as required, thereby performing scale-up and scale-down (of the video data outputted from the shift circuit 212) in the horizontal direction.

A shift circuit 213 processes the read data 208 (outputted from the internal storage read I/F 206) into pixel-unit data as required.

A LUT (Look Up Table) circuit 215 performs color conversion processing such as CLUT (Color Look Up Table) processing and gamma correction processing as required.

The CLUT processing is a processing to convert video data that is expressed by a color number such as OSD display data into color data on the basis of a CLUT. The gamma correction processing is also performed using a LUT for gamma correction.

An α-blending circuit 216 performs α-blending of the output of the DDA circuit 214 and the output of the LUT 215. The α-blending is a processing to blend images on the basis of α information expressing a transparency. While in this embodiment images are blended on the basis of predetermined α information, images to be blended themselves may have α information.

An internal storage write I/F 217 writes write data 219, which is obtained as a result of blending by the α-blending circuit 216, into the internal storage unit 104 according to an internal storage write address 218.

A processor 220 controls the operations of the respective units in the video processing circuit 103.

Hereinafter, a description will be given of the operation of the video processing circuit 103 constituted as described above.

Initially, the processor 220 gives a command to the external storage access request circuit 201, and an external storage request signal 202 and an external storage read address 203 are transmitted to the transfer control unit 102. Then, the external storage read data 204 is returned from the transfer control unit 102. Simultaneously, a request signal 205 is transmitted to the internal storage read I/F 206, and an internal storage read address 207 is issued in timing with the request signal 205. When the internal storage read address 207 is issued, read data 208 is returned from the internal storage unit 104 to the internal storage read I/F 206. The returned data is transferred to the shift circuit 213, and processed into dot-unit data as required. The processed data is transferred to the LUT circuit 215, and subjected to color conversion processing such as CLUT (Color Look Up Table) processing and gamma correction processing as required.

On the other hand, the external storage read data 204 is transmitted through the external storage access request circuit 201 and the selector circuit 211 to the shift circuit 212, and processed into dot-unit data as required. The processed data is transmitted through the DDA (Digital Differential Analysis) circuit 214 and subjected to scaling up or scaling down in the horizontal direction. The output of the DDA circuit 214 and the output of the LUT circuit 215 are subjected to α-blending in the α-blending circuit 216. A result of the α-blending is input to the internal storage write I/F 217, and the processing result is written in the internal storage unit 104 according to the internal storage write address 218 and the internal storage write data 219.

The above-mentioned α-blending circuit 216 is also able to perform, in addition to α-blending, vertical filtering by reading horizontal two lines on the same screen. For example, each of two lines of main video is read as an input of the α-blending and processed by the α-blending circuit 216, whereby vertical filtering can be carried out.

Further, when processing two kinds of data stored in the internal storage unit 104, a read timing is given to the internal storage read I/F 206 by the processor 220, and an internal storage read address 207 is given to the internal storage unit 104. Thereby, the read data 208 is returned from the internal storage unit 104, and two kinds of data from the internal storage unit 104 are read into the internal storage read I/F 206. One of the two kinds of data is transferred through the selector circuit 211 to the shift circuit 212, and processed into dot-unit data as required, and then the processed data is transferred through the DDA circuit to be subjected to scaling up or scaling down in the horizontal direction. The other data is transferred to the shift circuit 213, and processed into dot-unit data as required, and then transferred to the LUT circuit 215 to be subjected to CLUT processing or gamma correction as required. The output of the DDA circuit 214 and the output of the LUT circuit 215 are input to the α-blending circuit 216 to be α-blended. The α-blended data is transferred to the internal storage write I/F 217, and then transferred to the internal storage unit 104 according to the internal storage write address 218 and the internal storage write data 219. When the data stored in the internal storage unit 104 is processed and the data before the processing is not required, the data after the processing is written over the data before the processing, thereby reducing the capacity of the internal storage unit that is needed in this video composition circuit.

Finally, the final output data stored in the internal storage unit 104 is transferred through the read data 208 to the internal storage read I/F 206 using the internal storage read address 207. The transferred data is transferred to a parallel-serial conversion circuit 209 to be output as video output 210.

In the video composition circuit according to the first embodiment, video composition processing for combining the data of the external storage unit 101 and the data of the internal storage unit 104 is carried out using the video processing circuit 103 having the OSD display function, the sub-video display function, the main-video display function, and the α-blending function, and writing of the processing result into the internal storage unit 104 is repeated. Therefore, it is required to provide only one α-blending circuit having the OSD display function, the sub-video display function, the main-video display function, and the α-blending function, resulting in a reduction in the circuit scale. Further, since the OSD output unit, the sub-video output unit, and the main-video output unit are united to be one circuit, it is possible to realize processings such as scaling up and scaling down which have been realized for sub-video but have not been realized for OSD. Further, since overwriting of data is carried out as mentioned above, the amount of usage of the internal storage unit can be further reduced. Moreover, since vertical filtering for the data in the external storage unit and the data in the internal storage unit is carried out using the α-blending function of the video processing circuit, whereby the α-blending circuit can be operated as a vertical filter circuit, resulting in a further reduction in the circuit scale.

Further, since the video composition circuit needs to have only one DDA circuit and one α-blending circuit in contrast to the conventional circuit, the number of these circuits can be reduced by half, resulting in a further reduction in the circuit scale.

In a video processing apparatus according to the present invention, a video processing unit, a video data composition unit, and a data storage unit are integrated as one circuit, whereby the circuit scale is reduced, resulting in a minimized apparatus.

The invention claimed is:

1. A video composition circuit comprising:
   a video processing unit (i) receiving pieces of video data successively input in serial order, (ii) performing a predetermined video processing to the received pieces of video data, and (iii) outputting the pieces of video data having the predetermined video processing performed thereon;
   a video data composition unit including an α-blending circuit for outputting α-blended video data; and
   an internal data storage unit for storing the α-blended video data output from the video data composition unit,
   wherein the video processing unit is operable to (i) receive the pieces of video data from an external storage unit, (ii) receive, from the internal data storage unit, the α-blended video data previously stored in the internal data storage unit, and (iii) perform the predetermined video processing on the received video data and the α-blended video data, and
   wherein the α-blending circuit combines (i) the α-blended video data previously stored by the internal data storage unit and (ii) the video data currently output from the video processing unit and combines the pieces of video data output from the video processing unit, to perform vertical filtering to the video data successively input in serial order and to the α-blended video data previously stored in the internal data storage unit.

2. A video composition circuit as defined in claim 1, wherein the video processing unit, the internal data storage unit, and the video data composition unit are constituted by a single chip.

3. A video composition circuit as defined in claim 1, wherein the pieces of video data successively input in serial order are main video, sub-video, and OSD video that is additional information to be displayed simultaneously with the main video and the sub-video.

4. A video composition circuit as defined in claim 3 further, wherein the video composition circuit further includes the external storage unit that is disposed outside the single chip, and
   wherein the video data composition unit reads the pieces of video data output from the external storage unit and the α-blended video data stored in the internal data storage unit, and subjects the read pieces of video data and the α-blended video data to α-blending again.

5. A video composition circuit as defined in claim 1 wherein the video data composition unit writes video data obtained as a result of combining the α-blended video data previously stored by the internal data storage unit and the video data currently output from the video processing unit, over video data previously stored in the internal data storage unit.

* * * * *